(12) United States Patent
Luan

(10) Patent No.: US 11,169,588 B2
(45) Date of Patent: Nov. 9, 2021

(54) METHOD AND APPARATUS FOR DETECTING WEARING STATE OF SMART WEARABLE DEVICE

(71) Applicant: GOERTEK TECHNOLOGY CO., LTD, Qingdao (CN)

(72) Inventor: Haojie Luan, Qingdao (CN)

(73) Assignee: GOERTEK TECHNOLOGY CO, LTD, Shandong Province (CN)

( * ) Notice: Subject to any disclaimer, the term of this patent is extended or adjusted under 35 U.S.C. 154(b) by 0 days.

(21) Appl. No.: 16/754,893

(22) PCT Filed: Dec. 25, 2017

(86) PCT No.: PCT/CN2017/118280
§ 371 (c)(1),
(2) Date: Apr. 9, 2020

(87) PCT Pub. No.: WO2019/075914
PCT Pub. Date: Apr. 25, 2019

(65) Prior Publication Data
US 2020/0379545 A1    Dec. 3, 2020

(30) Foreign Application Priority Data

Oct. 20, 2017  (CN) .......................... 201710984369.4

(51) Int. Cl.
*G06F 1/3231*  (2019.01)
*G06F 1/16*  (2006.01)
*G01V 8/10*  (2006.01)

(52) U.S. Cl.
CPC ............ *G06F 1/3231* (2013.01); *G06F 1/163* (2013.01); *G01V 8/10* (2013.01)

(58) Field of Classification Search
CPC ........ G06F 1/163; G06F 1/3231; G06F 21/34; A61B 5/0002; A61B 5/681; A61B 5/6802; A61B 5/1118
See application file for complete search history.

(56) References Cited

U.S. PATENT DOCUMENTS

2015/0057964 A1* 2/2015 Albinali ................. G16H 40/67
                                                    702/141
2015/0371028 A1* 12/2015 Patel .................... H04L 63/0853
                                                    726/16
(Continued)

FOREIGN PATENT DOCUMENTS

CN    105445812 A    3/2016
CN    105487372 A    4/2016
(Continued)

OTHER PUBLICATIONS

International Written Opinion corresponding to International Application No. PCT/CN2017/118280, dated Jul. 13, 2018.

(Continued)

*Primary Examiner* — Mirza F Alam
(74) *Attorney, Agent, or Firm* — Arent Fox LLP

(57) ABSTRACT

A method and apparatus for detecting a wearing state of a smart wearable device, which utilizes the characteristic that there is a difference in the reflection of infrared rays having different light intensities by different objects, acquires a first effective mean value of light intensities of reflection signals of a first infrared ray and a second effective mean value of light intensities of reflection signals of a second infrared ray, and judge the wearing state of the smart wearable device by the difference between the first and second effective mean values, thereby avoiding misjudgment caused by judging the wearing state by distance and misjudgment caused by judgment conditions such as temperature difference and capacitance difference which are greatly affected by the surround- (Continued)

ing environment. The reflection signals of two infrared rays having different light intensities are used in comparing, which improves the accuracy of judgment.

15 Claims, 4 Drawing Sheets

(56) References Cited

U.S. PATENT DOCUMENTS

| | | | | |
|---|---|---|---|---|
| 2016/0267771 A1* | 9/2016 | Baek | .................. | H04M 1/7253 |
| 2018/0132031 A1* | 5/2018 | Seo | ...................... | H04R 1/1041 |
| 2019/0215611 A1* | 7/2019 | Lou | ........................ | G06F 1/163 |

FOREIGN PATENT DOCUMENTS

| | | |
|---|---|---|
| CN | 106153098 A | 11/2016 |
| CN | 106291121 A | 1/2017 |
| CN | 106645978 A | 5/2017 |
| CN | 106647952 A | 5/2017 |
| JP | 2013212315 A | 10/2013 |

OTHER PUBLICATIONS

International International Search Report corresponding to International Application No. PCT/CN2017/118280, dated Jul. 13, 2018.
China First Office Action corresponding to Chinese Application No. 201710984369.4, dated Sep. 5, 2018.

* cited by examiner

METHOD AND APPARATUS FOR DETECTING WEARING STATE OF SMART WEARABLE DEVICE

CROSS-REFERENCE TO RELATED APPLICATIONS

The present application is a U.S. National Stage entry under 35 U.S.C. § 371 based on International Application No. PCT/CN2017/118280, filed on Dec. 25, 2017, which claims priority to Chinese application No. 201710984369.4, titled "Method and Apparatus for Detecting Wearing State of Smart Wearable Device", filed on Oct. 20, 2017, and entire contents of which are incorporated herein by reference.

TECHNICAL FIELD

The present disclosure relates to the technical field of wearing detection of smart wearable devices, and in particular, to a method and an apparatus for detecting a wearing state of a smart wearable device.

BACKGROUND

The conventional wearing detection method usually irradiates an object to be detected with an infrared ray having a fixed intensity, and judges whether a smart wearable device is worn by detecting the distance between the irradiator and the object by using the infrared ray. This detection method is very liable to cause misjudgment. When a smart wearable device is placed flat on a table or close to the surface of another object, the accuracy of wearing detection of the smart wearable device cannot be guaranteed. In addition, the prior art uses auxiliary conditions for judgment such as temperature difference and capacitance difference between the upper and lower surfaces of the smart wearable device, but these conditions are easily affected by the surrounding environment, causing misjudgment as well as the problem of higher power consumption.

SUMMARY

In order to solve the problem of inaccurate detection of the wearing state of the smart wearable device in the prior art, the present disclosure provides a method and an apparatus for detecting a wearing state of a smart wearable device.

According to an aspect of the present disclosure, a method for detecting a wearing state of a smart wearable device is provided, the smart wearable device is provided with an infrared sensor, and the method comprises:

controlling the infrared sensor to emit a first infrared ray, and acquiring a first effective mean value of light intensities of reflection signals of the first infrared ray;

controlling the infrared sensor to emit a second infrared ray, and acquiring a second effective mean value of light intensities of reflection signals of the second infrared ray; and calculating a difference between the first effective mean value and the second effective mean value as a first difference, and if an absolute value of the first difference is less than a first preset difference threshold, outputting that the smart wearable device is in a non-wearing state;

wherein a light intensity of the first infrared ray and a light intensity of the second infrared ray are set in advance, and the light intensity of the second infrared ray is not equal to the light intensity of the first infrared ray.

Preferably, when the first difference is not less than the first preset difference threshold, it is outputted that the smart wearable device is in a wearing state.

Preferably, when the first difference is not less than the first preset difference threshold, the method further comprises:

controlling the infrared sensor to emit a third infrared ray, wherein a light intensity of the third infrared ray is set in advance and is not equal to either one of the light intensity of the first infrared ray and the light intensity of the second infrared ray;

acquiring a third effective mean value of light intensities of reflection signals of the third infrared ray; and calculating a difference between the first effective mean value and the third effective mean value as a second difference, and if an absolute value of the second difference is less than a second preset difference threshold, outputting that the smart wearable device is in a non-wearing state, otherwise outputting that the smart wearable device is in a wearing state.

Preferably, the acquiring a first effective mean value of light intensities of reflection signals of the first infrared ray comprises:

sampling a predetermined number of the reflection signals of the first infrared ray to acquire a group of sampled signals, and calculating a variance and a mean value of light intensities of the group of sampled signals; and if it is judged that the variance is less than a preset variance threshold, taking the mean value as the first effective mean value, otherwise re-sampling the reflection signals of the first infrared ray to acquire a new group of sampled signals, calculating the variance and the mean value for judgment, and accumulating a number times of sampling; when the number times of sampling accumulated exceeds a preset number of times of sampling, outputting that the smart wearable device is in a non-wearing state.

Preferably, the acquiring a second effective mean value of light intensities of reflection signals of the second infrared ray comprises:

sampling a predetermined number of the reflection signals of the second infrared ray to acquire a group of sampled signals, and calculating a variance and a mean value of light intensities of the group of sampled signals; and if it is judged that the variance is less than a preset variance threshold, taking the mean value as the second effective mean value, otherwise outputting that the smart wearable device is in a non-wearing state.

Preferably, the acquiring a third effective mean value of light intensities of reflection signals of the third infrared ray comprises:

sampling a predetermined number of reflection signals of the third infrared ray to acquire a group of sampled signals, and calculating a variance and a mean value of light intensities of the group of sampled signals; and if it is judged that the variance is less than a preset variance threshold, taking the mean value as the third effective mean value, otherwise outputting that the smart wearable device is in a non-wearing state.

Preferably, the method further comprises:

recording and analyzing a user's wearing habit of the smart wearable device, and periodically activating the infrared sensor to detect a wearing state of the smart wearable device according to the user's wearing habit;

and/or before the smart wearable device performs a test of a preset item, activating the infrared sensor to detect a wearing state of the smart wearable device.

According to another aspect of the present disclosure, an apparatus for detecting a wearing state of a smart wearable device is provided, the smart wearable device is provided with an infrared sensor, and the apparatus comprises:

a light intensity controlling unit configured to control the infrared sensor to emit a first infrared ray and a second infrared ray, wherein a light intensity of the first infrared ray and a light intensity of the second infrared ray are set in advance, and the light intensity of the second infrared ray is not equal to the light intensity of the first infrared ray;

a mean value acquiring unit configured to acquire a first effective mean value of light intensities of reflection signals of the first infrared ray, and acquire a second effective mean value of light intensities of reflection signals of the second infrared ray;

a mean value comparing unit configured to calculate a difference between the first effective mean value and the second effective mean value as a first difference, and compare an absolute value of the first difference with a first preset difference threshold; and a wearing state outputting unit configured to, if the absolute value of the first difference is less than the first preset difference threshold, output that the smart wearable device is in a non-wearing state.

Preferably, the light intensity controlling unit is further configured to control the infrared sensor to emit a third infrared ray, wherein a light intensity of the third infrared ray is set in advance and is not equal to either one of the light intensity of the first infrared ray and the light intensity of the second infrared ray;

the mean value acquiring unit is further configured to acquire a third effective mean value of light intensities of reflection signals of the third infrared ray;

the mean value comparing unit is further configured to calculate a difference between the first effective mean value and the third effective mean value as a second difference, and compare an absolute value of the second difference with a second preset difference threshold; and the wearing state outputting unit is further configured to, if the absolute value of the second difference is less than the second preset difference threshold, output that the smart wearable device is in a non-wearing state, otherwise output that the smart wearable device is in a wearing state.

According to still another aspect of the present disclosure, a smart wearable device is provided, the smart wearable device is provided with an infrared sensor, wherein the smart wearable device comprises a memory and a processor, the memory and the processor are communicatively connected through an internal bus, a computer program executable by the processor is stored in the memory, and when the computer program is executed by the processor, steps of the above methods are able to be implemented.

The technical solution of the present disclosure utilizes the characteristic that there is a difference in the reflection of infrared rays having different light intensities by different objects. It collects reflection signals of two infrared rays having different light intensities, and uses the difference between the effective mean values of different reflection signals as a condition to judge whether the smart wearable device is worn. By collecting the reflection signals from objects irradiated by infrared rays having different light intensities, and comparing the difference between the light intensities of the reflection signals under different irradiating light intensities with a preset difference threshold, the wearing state of the smart wearable device can be accurately judged, thereby avoiding misjudgment caused by judging the wearing state by distance and misjudgment caused by judgment conditions such as temperature difference and capacitance difference which are greatly affected by the surrounding environment. Moreover, two infrared rays having different light intensities are used in irradiating and comparing, which enhances the judgment standard and reduces the possibility of misjudgment.

BRIEF DESCRIPTION OF DRAWINGS

The accompanying drawings constituting a part of the present application are used to provide a further understanding of the present disclosure. The exemplary embodiments and description thereof of the present disclosure are used to explain the present disclosure, and do not constitute undue limitation on the present disclosure. In the drawings.

DETAILED DESCRIPTION

In order to solve the technical problem proposed in the background art, the inventors of the present application conceived of utilizing the characteristic that there is a difference in the reflection of infrared rays having different light intensities by different objects, acquiring reflection signals of two infrared rays having different light intensities, calculating the mean values of the light intensities of the reflection signals, and judging the wearing state of the smart wearable device according to the difference between the two mean values. In order to make the objects, technical solutions and advantages of the present disclosure clearer, the present disclosure will be further described in detail with reference to the accompanying drawings.

First Embodiment

Figure 1:
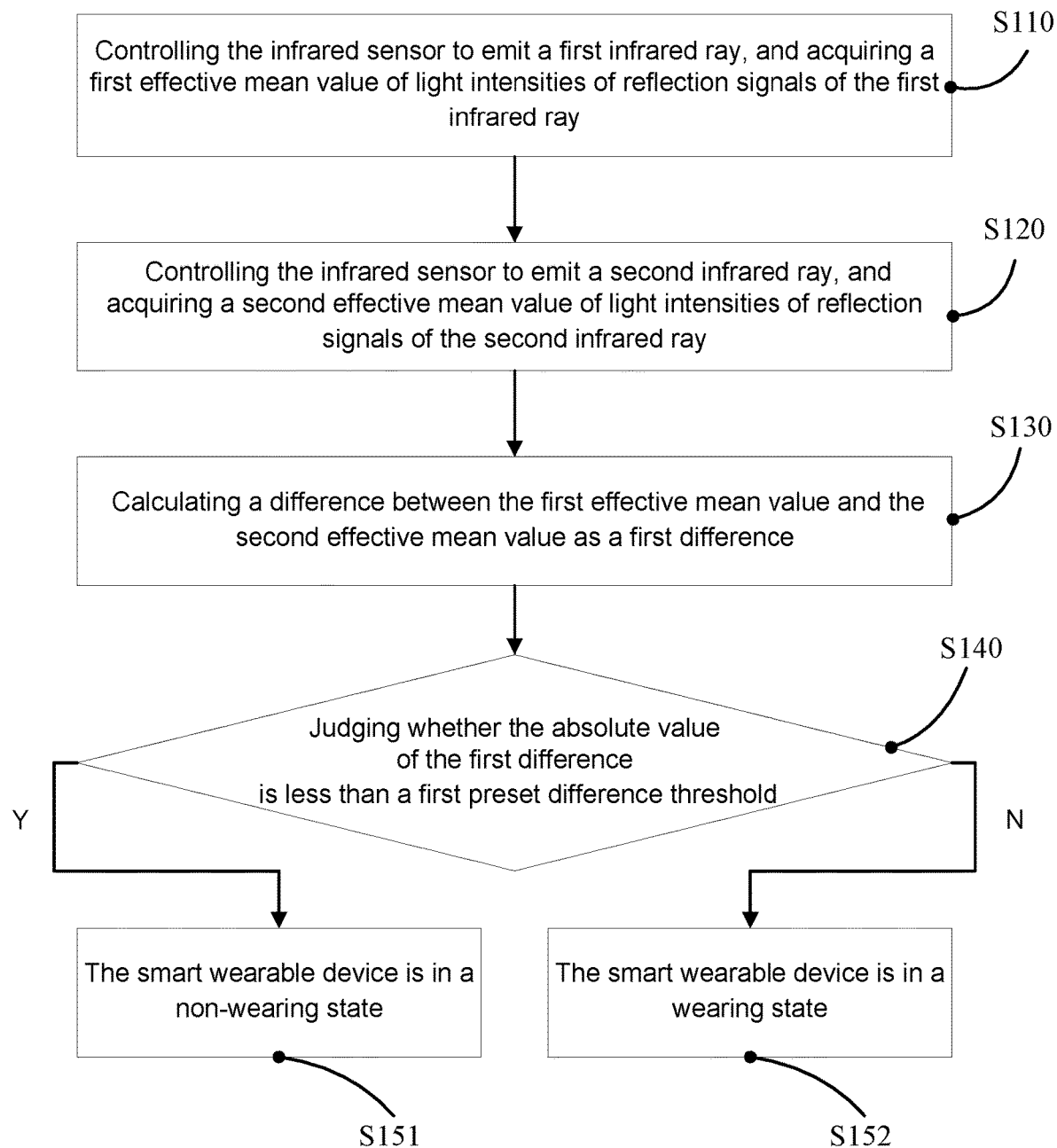
FIG. 1 is a method for detecting a wearing state of a smart wearable device according to an embodiment of the present disclosure.

FIG. 1 is a flowchart of detecting the wearing state of a smart wearable device by using two infrared rays having different light intensities. Referring to FIG. 1, the present embodiment uses two infrared rays having different light intensities to irradiate an object, and specifically comprises:

Step S110, controlling the infrared sensor to emit a first infrared ray, and acquiring a first effective mean value of light intensities of reflection signals of the first infrared ray.

The smart wearable device is provided with a micro processor. The processor controls the infrared sensor to emit an infrared ray, and reflection signals are generated when the infrared ray encounters an object. The reflection signals are collected, the light intensities of the reflection signals are analyzed and acquired, and the effective mean value of the light intensities of the reflection signals is calculated. The light intensity of the infrared ray emitted by the infrared sensor is determined by the current passing through the infrared sensor. In this detection method, the light intensities of all infrared rays are set in advance, and the light intensities of the respective infrared rays are not equal to each other. The infrared sensor is controlled to first emit a first infrared ray, the reflection signals of the first infrared ray are collected, and the effective mean value of the light intensities of the reflection signals of the first infrared ray is analyzed and calculated, and recorded as a first effective mean value.

Step S120, controlling the infrared sensor to emit a second infrared ray, and acquiring a second effective mean value of light intensities of reflection signals of the second infrared ray.

The processor adjusts the current passing through the infrared sensor and controls the infrared sensor to emit a second infrared ray. It should be noted that the light intensity of the second infrared ray is not equal to the light intensity of the first infrared ray, and may be greater or less than the light intensity of the first infrared ray. In this step, the reflection signals of the second infrared ray are collected, and the effective mean value of the light intensities of the reflection signals of the second infrared ray is obtained and recorded as a second effective mean value.

Step S130, calculating a difference between the first effective mean value and the second effective mean value as a first difference.

Step S140, judging whether the absolute value of the first difference is less than a first preset difference threshold. If yes, the process goes to S151; if no, the process goes to S152.

Different objects generate different reflection signals with respect to infrared rays having the same light intensity. Herein, different reflection signals refer to the reflection signals having different light intensities. The same object also generates different reflection signals with respect to different infrared rays. The reflection of infrared ray by the human body varies as the light intensity of the infrared ray increases. For example, when infrared rays having light intensities of 1000 and 3000 irradiate on the human body, the light intensities of the reflection signals are 100 and 600, respectively. The reflection of infrared rays by objects is different from the reflection of infrared rays by human bodies. For example, the light intensities of reflection signals of infrared rays having light intensities of 1000 and 3000 by the object are 100 and 200, respectively. It can be seen that the difference between the reflection signals of infrared rays having different light intensities by the human body is relatively larger. Therefore, by comparing the difference between the light intensities of the reflection signals under different irradiating light intensities and a preset difference threshold, the wearing state of the smart wearable device can be determined.

Step S151, the smart wearable device is in a non-wearing state.

In this step, the absolute value of the first difference is less than the first preset difference threshold, which indicates that the smart wearable device is not irradiating the human body, so it is judged that the smart wearable device is not worn on the human body and is in a non-wearing state.

Step S152, the smart wearable device is in a wearing state.

In this step, the absolute value of the first difference is not less than the first preset difference threshold, which indicates that the smart wearable device is irradiating the human body, so it is judged that the smart wearable device is in a wearing state.

It can be seen from FIG. 1 that in the present embodiment, the reflection signals of the first infrared rays and the second infrared rays are acquired, the effective mean values of the light intensities of the two sets of reflection signals are analyzed and acquired, the difference between the two effective mean values is calculated, and the wearing state of the smart wearable device is judged by comparing the absolute value of the difference with a preset difference threshold. The method uses two infrared rays having different light intensities for testing, which improves the accuracy of wearing state judgment.

Second Embodiment

Figure 2:
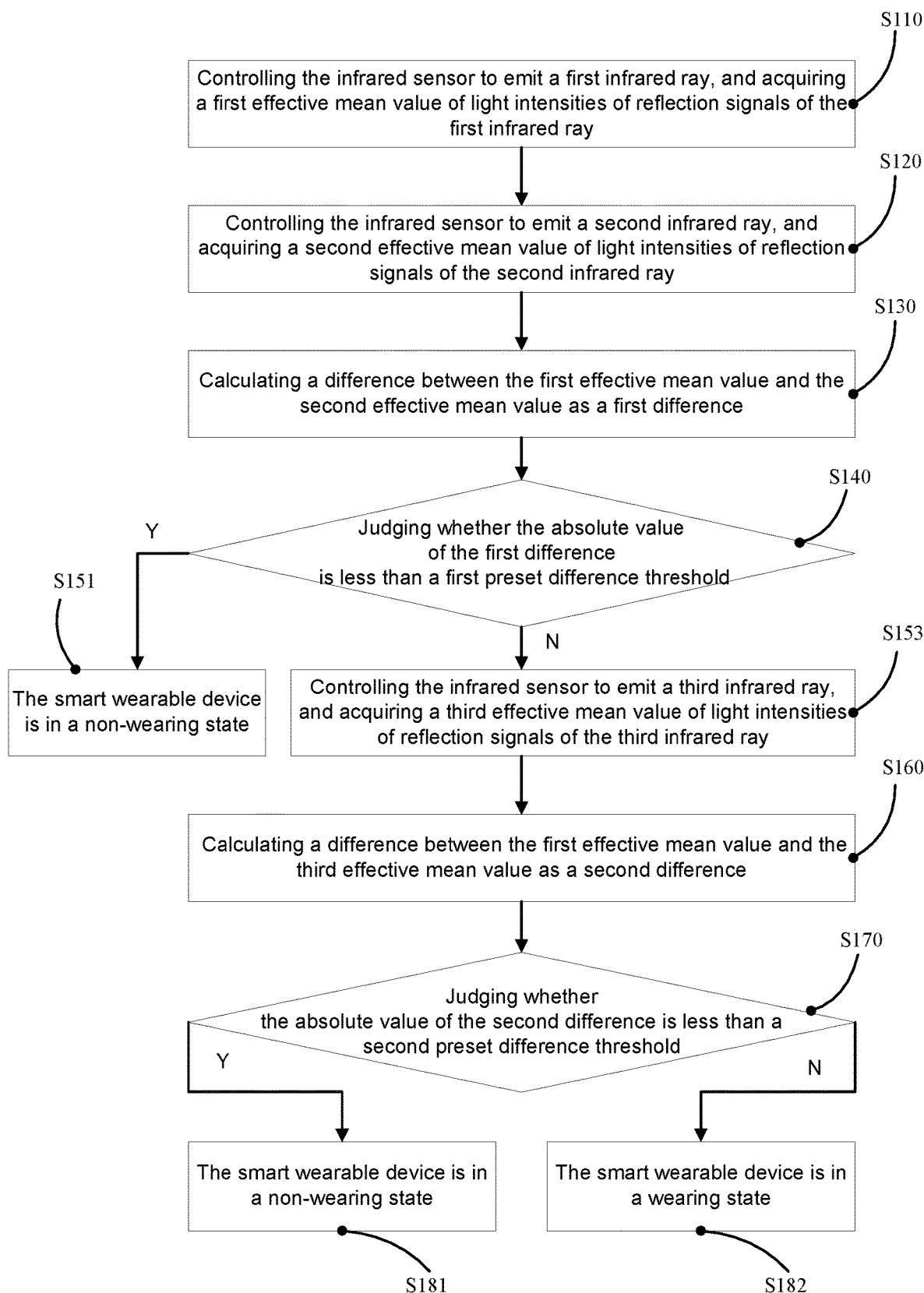
FIG. 2 is a method for detecting a wearing state of a smart wearable device according to another embodiment of the present disclosure.

In order to further improve the accuracy in judging the wearing state and reduce the misjudgment, as shown in FIG. 2, a third infrared ray irradiating the object is added, and a judgment condition is added, so that the conditions for outputting the wearing state are more stringent.

The present embodiment is the same as the first embodiment in emitting the first and second infrared rays and acquiring the effective mean values. It differs from the first embodiment in that when the absolute value of the first difference is not less than the first preset difference threshold, instead of outputting that the smart wearable device in a wearing state, the infrared sensor is controlled to emit a third infrared ray, as in step S153: controlling the infrared sensor to emit a third infrared ray, and acquiring a third effective mean value of light intensities of reflection signals of the third infrared ray. The light intensity of the third infrared ray is also set in advance, and is not equal to either the light intensity of the first infrared ray or the light intensity of the second infrared ray. The light intensities of the first, second, and third infrared rays may be gradually increased or gradually decreased, or may be arranged in other ways, which is not limited in the present disclosure.

Step S160, calculating a difference between the first effective mean value and the third effective mean value as a second difference.

Step S170, judging whether the absolute value of the second difference is less than a second preset difference threshold. The absolute value of the second difference is compared with the second preset difference threshold, and if the absolute value of the second difference is less than the second preset difference threshold, the process goes to step S181, where it is outputted that the smart wearable device is in a non-wearing state, otherwise, the process goes to step S182, where it is outputted that the smart wearable device is in a wearing state. It can be seen that only when the first difference is not less than the first preset difference threshold and the second difference is not less than the second preset difference threshold, it is outputted that the smart wearable device is in a wearing state. The judgment conditions are more, so conditions for outputting that the smart wearable device is in a wearing state are more stringent, and thus the output result is more accurate.

In the above two embodiments, the infrared sensor is controlled to emit infrared rays having different light intensities by adjusting the current passing through the infrared sensor. When currents having different magnitudes pass through the infrared sensor, it emits infrared rays having corresponding light intensities. The first infrared ray is emitted under the first passing current; when the current is adjusted to the second passing current, the second infrared ray is emitted; when the current is adjusted to the third passing current, the infrared sensor emits the third infrared ray.

It can be understood that, in order for the smart wearable device to output a more accurate wearing state, the difference between the second effective mean value and the third effective mean value may also be calculated as a third difference, and the third difference is compared with a third preset difference threshold. If the absolute value of the third difference is less than the third preset difference threshold, it is outputted that the smart wearable device is in a non-wearing state, otherwise it is outputted that the smart wearable device is in a wearing state. In addition, a fourth infrared ray may be added for comparing, thereby making the conditions for outputting wearing conditions more stringent and acquiring more accurate results. However, it should be noted that when the preset difference thresholds are selected reasonably, the use of the combination of two infrared rays having different intensities is sufficient to judge the wearing state of the smart wearable device. The use of the combination of three or more infrared rays having different intensities in detection will cause the problem of higher power consumption, and has not much impact on the accuracy of detection results.

Third Embodiment

Figure 3:
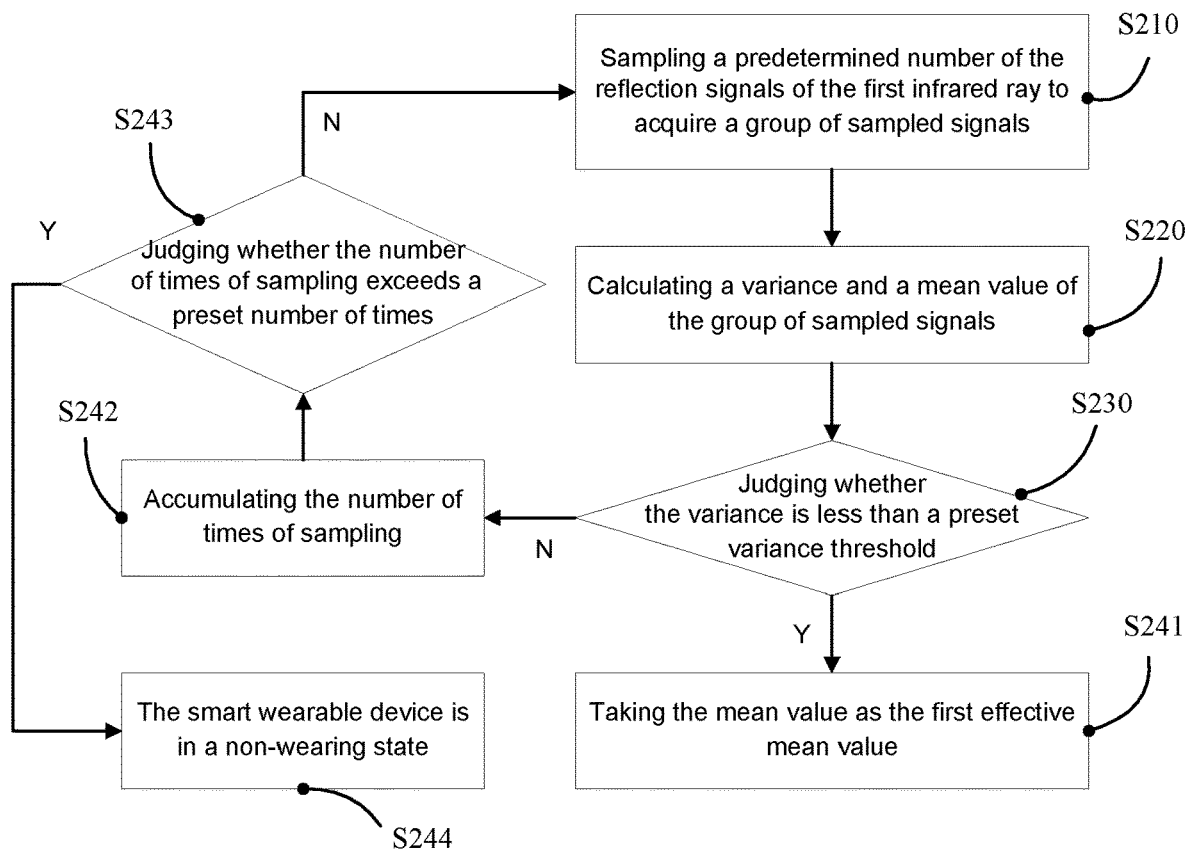
FIG. 3 is a flowchart of acquiring a first effective mean value according to an embodiment of the present disclosure.

FIG. 3 is a flowchart of acquiring a first effective mean value. Referring to FIG. 3, in the present embodiment, the steps of acquiring the first effective mean value comprise:

Step S210, sampling a predetermined number of the reflection signals of the first infrared ray to acquire a group of sampled signals.

The infrared sensor emits an infrared ray. If there is an obstacle on the light path of the infrared ray, the infrared ray will be reflected and reflection signals will be generated. The reflection signals are sampled, and the light intensities of a certain number of sampled signals are taken as a group of data. There may be errors in the sampled signals. If the light intensity of only one sampled signal is used for judgment, the number of samples is too small to be representative, and the error may be large. Therefore, increasing the number of samples and using the light intensities of a certain number of sampled signals as a group of judgment data can reduce errors and reduce the probability of misjudgment.

Step S220, calculating a variance and a mean value of the light intensities of the group of sampled signals.

The mean value of the group of data is taken as the final output result, so that the result obtained has a smaller error and is closer to the true value.

Step S230, judging whether the variance is less than a preset variance threshold; if yes, the process goes to step S241, and if not, the process goes to step S242.

Variance is a measure of how disperse the data is. If the variance of the light intensities of the sampled signals is too large, that is, the dispersion degree of the sampled signals is large, it indicates that the sampled signals are unstable, and there may be a certain disturbance when the reflection signals are sampled. The existence of the disturbance makes the error of the sampled signals large, and the result of the group of sampled signals cannot be used as the final output result, and the reflection signals need to be re-sampled. If the variance of the light intensities of the group of sampled signals is less than the preset variance threshold, it indicates that the group of sampled signals has a small degree of dispersion, the error of the sampled signals is also small and in a reasonable range, and the result can be used as the output result.

Step S241, taking the mean value as the first effective mean value.

If the variance of the light intensities of the sampled signals is less than the preset variance threshold, the distribution of the sampled signals is within a preset range, and the error of the sampled signals is within an acceptable range, and the result of the group of sampled signals can be used as the final output result. It should be noted that, in this case, the error of the sampled signals is small, which means that the disturbance is small, and the smart wearable device is in a stable state.

Step S242, accumulating the number of times of sampling.

In this step, the variance of the light intensities of the sampled signals is greater than the preset variance threshold, which indicates that there is disturbance and the reflection signals are unstable, and the sampling must be re-performed. Every time the sampling is re-performed, the number of times of sampling is accumulated.

Step S243, judging whether the number of times of sampling exceeds a preset number of times, and if not, the process returns to step S210 to re-sample the reflection signals.

Before re-sampling the reflection signals, it is judged whether the number of times of sampling exceeds a preset number of times. If the number of times of sampling exceeds the preset number of times, it indicates that the disturbance is still present and the reflection signals are unstable, and the smart wearable device is still in an unstable state. It is impossible to perform judgment of the wearing state, and it is also impossible to activate necessary monitoring functions, such as heart rate monitoring. At this point, the process goes to step S244, where it is directly outputted that the smart wearable device is in a non-wearing state, so as to prompt the user to make corresponding adjustments. If the number of times of sampling does not exceed the preset number of times, the process returns to step S210, where the reflection signals are re-sampled to acquire a new group of sampled signals.

Figure 4:
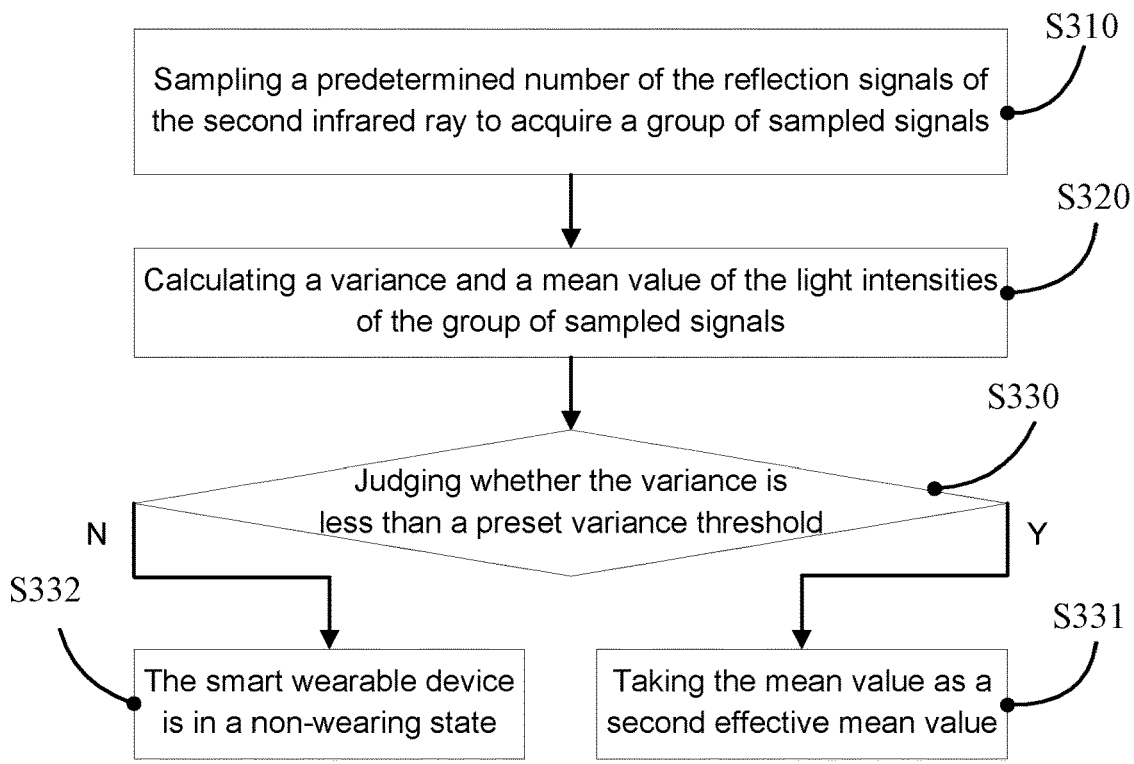
FIG. 4 is a flowchart of acquiring a second effective mean value according to an embodiment of the present disclosure.

In an embodiment of the present disclosure, the steps of acquiring the second effective mean value are similar to the steps of acquiring the first effective mean value. As shown in FIG. 4, the specific steps are as follows:

Step S310: sampling a predetermined number of the reflection signals of the second infrared ray to acquire a group of sampled signals;

Step S320: calculating a variance and a mean value of the light intensities of the group of sampled signals;

Step S330: judging whether the variance is less than a preset variance threshold. If the variance is less than the preset variance threshold, the process goes to step S331, otherwise the process goes to step S332;

Step S331: taking the mean value as a second effective mean value; and

Step S332: directly outputting that the smart wearable device is in a non-wearing state.

Only after the first effective mean value is outputted, the second effective mean value is acquired. When the first effective mean value is outputted, the smart wearable device is already in a stable state without disturbance. If the reflection signals of the second infrared ray are sampled at this point, the sampled signals obtained are all stable signals. If the variance of the sampled signals of the second infrared ray is greater than the preset variance threshold, that is, the degree of dispersion of the sampled signals is different from the preset degree of dispersion, it indicates that the infrared rays are not irradiating the human body, and it can be outputted directly that the smart wearable device is in a non-wearing state without the need of re-sampling.

In an embodiment of the present disclosure, the steps of acquiring the third effective mean value are the same as the steps of acquiring the second effective mean value. Specifically, sampling a predetermined number of the reflection signals of the third infrared ray to acquire a group of sampled signals; calculating a variance and a mean value of the light intensities of the group of sampled signals; judging whether the variance is less than a preset variance threshold, and if the variance is less than the preset variance threshold, taking the mean value as the second effective mean value, otherwise directly outputting that the smart wearable device is in a non-wearing state.

It can be understood that, when using two infrared rays having different intensities to judge the wearing state, it is not necessary to acquire the third effective mean value, in other words, the infrared sensor does not emit the third infrared ray. Only when the wearing state is judged by using three infrared rays having different intensities, the third effective mean value is acquired. The acquiring of the third effective mean value and the acquiring of the second effective mean value may be performed simultaneously or sequentially.

It should be noted that, when the wearing state is judged by using more than three infrared rays having different intensities, the subsequent effective mean values are acquired in the same manner as the second effective mean value and the third effective mean value, which is not repeated here.

In an embodiment of the present disclosure, the smart wearable device records and analyzes the wearing habit of the user, and periodically activates the infrared sensor to detect the wearing state of the smart wearable device according to the user's wearing habit. Alternatively, before the smart wearable device performs a test of a preset item, the infrared sensor is activated to detect a wearing state of the smart wearable device.

Specifically, the smart wearable device records the time at which the wearing state is outputted every day, and by analyzing the time at which the wear state is outputted, the user's habit of wearing the smart wearable device every day can be obtained. During the user's wearing time period, the detection of the wearing state is activated automatically to judge whether the user is wearing the device. Alternatively, before the user performs a test of an item, such as heart rate monitoring, sleep monitoring, etc., the detection of the wearing state is activated to ensure that the test of the item goes smoothly.

Fourth Embodiment

Figure 5:
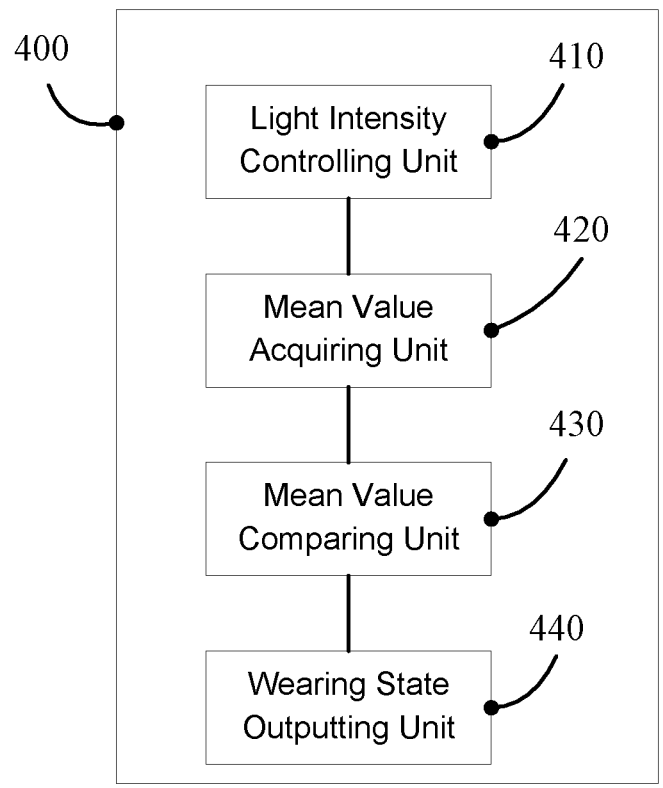
FIG. 5 is an apparatus for detecting a wearing state of a smart wearable device according to an embodiment of the present disclosure.

FIG. 5 is an apparatus 400 for detecting the wearing state of a smart wearable device according to an embodiment of the present disclosure. Referring to FIG. 5, the apparatus 400 for detecting the wearing state of a smart wearable device comprises:

a light intensity controlling unit 410 configured to control an infrared sensor to emit infrared rays. Specifically, a processor in the smart wearable device controls the infrared sensor so that it emits a first infrared ray and a second infrared ray;

a mean value acquiring unit 420 configured to acquire a first effective mean value of light intensities of reflection signals of the first infrared ray having a first light intensity, and acquire a second effective mean value of light intensities of reflection signals of the second infrared ray having a second light intensity;

a mean value comparing unit 430 configured to calculate a difference between the first effective mean value and the second effective mean value as a first difference, and compare an absolute value of the first difference with a first preset difference threshold; and a wearing state outputting unit 440 configured to output a wearing state of the smart wearable device. If the absolute value of the first difference is greater than the first preset difference threshold, it is outputted that the smart wearable device is in a wearing state, otherwise it is outputted that the smart wearable device is in a non-wearing state.

In an embodiment of the present disclosure, the light intensity controlling unit 410 is further configured to control the infrared sensor to emit a third infrared ray. The light intensity of the third infrared ray is set in advance, and is not equal to either one of the light intensity of the first infrared ray and the light intensity of the second infrared ray.

The mean value acquiring unit 420 is further configured to acquire a third effective mean value of light intensities of reflection signals of the third infrared ray.

The mean value comparing unit 430 is further configured to calculate a difference between the first effective mean value and the third effective mean value as a second difference, and compare an absolute value of the second difference with a second preset difference threshold.

The wearing state outputting unit 440 is further configured to output that the smart wearable device is in a non-wearing state if the absolute value of the second difference is less than the second preset difference threshold, otherwise output that the smart wearable device is in a wearing state.

In the present embodiment, the mean value acquiring unit 420 further comprises the following modules:

a first sampling module configured to sampling a predetermined number of the reflection signals of the first infrared ray to acquire a group of sampled signals;

a first calculating module configured to calculate a variance and a mean value of light intensities of the group of sampled signals acquired by the first sampling module;

a first variance judging module configured to judge whether the variance calculated by the first calculating module is less than a preset variance threshold. If less, the process goes to the first mean value outputting module, otherwise the process returns to the first sampling module and accumulates the number of times of sampling; when the accumulated number of times of sampling exceeds a preset number of times of sampling, the wearing state outputting unit 440 outputs that the smart wearable device is in a non-wearing state;

a first mean value outputting module configured to output the mean value calculated by the first calculating module as a first effective mean value;

a second sampling module configured to sampling a predetermined number of the reflection signals of the second infrared ray to acquire a group of sampled signals; or sampling a predetermined number of the reflection signals of the third infrared ray to acquire a group of sampled signals;

a second calculating module configured to calculate a variance and a mean value of the light intensities of the sampled signals for a group of sampled signals acquired by the second sampling module;

a second variance judgment module configured to judge whether the variance calculated by the second calculating module is less than a preset variance threshold. If less, the process goes to the second mean value outputting module; otherwise, the wearing state outputting unit 440 outputs that the smart wearable device is in a non-wearing state; and a second mean value outputting module configured to output the mean value calculated by the second calculating module as a second effective mean value; or output the mean value calculated by the second calculating module as a third effective mean value.

Since the steps of acquiring the second effective mean value and the steps of acquiring the third effective mean value are the same, they are performed in the same module. If the second sampling module samples the second infrared ray, the second mean value outputting module outputs the second effective mean value; if the second sampling module samples the third infrared ray, the second mean value outputting module outputs the third effective mean value.

In an embodiment of the present disclosure, the light intensity controlling unit 410 of the apparatus 400 for detecting the wearing state of a smart wearable device is further used to adjust the current passing through the infrared sensor, and control the infrared sensor to emit the first infrared ray, the second infrared ray, or the third infrared ray.

In an embodiment of the present disclosure, the apparatus 400 for detecting the wearing state of a smart wearable device further comprises an activation unit configured to periodically activate the infrared sensor to detect the wearing state of the smart wearable device according to the recorded and analyzed user's wearing habit of the smart wearable device. At the same time, the activation unit also activates the infrared sensor to detect the wearing state of the smart wearable device before the smart wearable device performs a test of a preset item.

The apparatus 400 for detecting the wearing state of a smart wearable device according to the present embodiment may be used to execute the foregoing method embodiments, and the principle and technical effects thereof are similar to those in the method embodiments, which will not be repeated herein.

Figure 6:
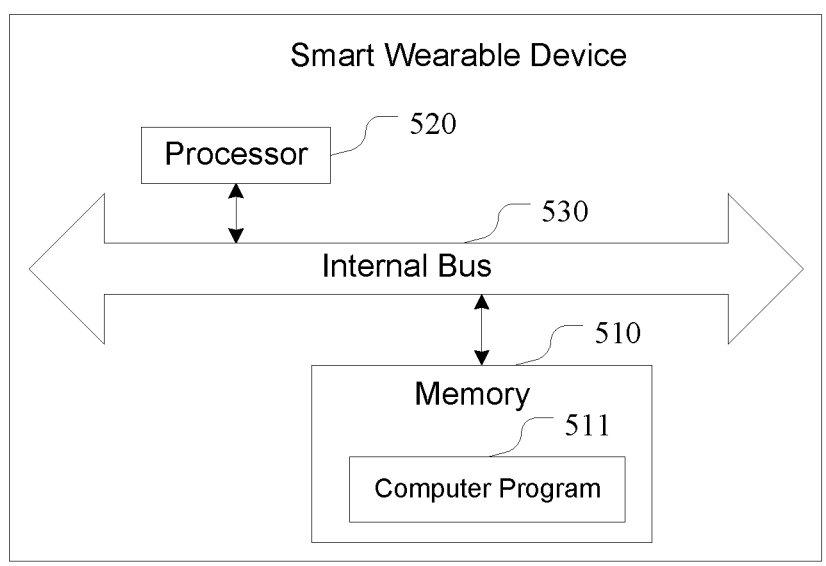
FIG. 6 is a smart wearable device according to an embodiment of the present disclosure.

In another embodiment of the present disclosure, the smart wearable device is provided with an infrared sensor. As shown in FIG. 6, the smart wearable device further comprises a memory 510 and a processor 520, and the memory 510 and the processor 520 are communicatively connected through an internal bus 530 and are used to detect the wearing state of the smart wearable device. The memory 510 stores a computer program 511 that can be executed by the processor 520. When the computer program 511 is executed by the processor 520, the computer program 511 can be used to implement the steps of the methods for detecting the wearing state of the smart wearable device as stated above.

In sum, the technical solution of the present disclosure utilizes the characteristic that there is a difference in the reflection of infrared rays having different light intensities by different objects. It acquires the effective mean values of the light intensities of the reflection signals under the irradiation of infrared rays having different light intensities, calculates the difference between two effective mean values, and judge the wearing state of the smart wearable device by comparing the difference with a preset difference threshold, thereby avoiding misjudgment caused by judging the wearing state by distance and misjudgment caused by judgment conditions such as temperature difference and capacitance difference which are greatly affected by the surrounding environment. The reflection signals of two infrared rays having different light intensities are used in comparing, which improves the accuracy of judgment.

The present disclosure further provides the technical solution in which a third infrared ray for irradiating the object is added for detecting the wearing state of the smart wearable device. When the third infrared ray is added, the judgment conditions also increase, which makes the conditions for outputting that the smart wearable device is in a wearing state more stringent, so the output result is more accurate.

The technical solution of the present disclosure also provides a method for acquiring an effective mean value. It is judged whether the smart wearable device is in a stable state by the variance of the light intensities of the reflection signals, and the effective mean value is acquired in a stable state, so as to ensure the accuracy of the effective mean value acquired and ensure the accuracy of judging the wearing state so that the smart wearable device performs detection of items when accurately determined in the wearing state. At the same time, the smart wearable device activates the detection of the wearing state as needed, for example, the detection is activated periodically according to the user's wearing habit, or the detection is activated before the test of the preset item, thereby avoiding the problem of power consumption caused by the real-time detection and achieving a good power saving effect.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A method for detecting a wearing state of a smart wearable device, the smart wearable device is provided with an infrared sensor, and the method comprises:
   controlling the infrared sensor to emit a first infrared ray, and acquiring a first effective mean value of light intensities of reflection signals of the first infrared ray;
   controlling the infrared sensor to emit a second infrared ray, and acquiring a second effective mean value of light intensities of reflection signals of the second infrared ray; and
   calculating a difference between the first effective mean value and the second effective mean value as a first difference, and if the absolute value of the first difference is less than a first preset difference threshold, outputting that the smart wearable device is in a non-wearing state;
   wherein a light intensity of the first infrared ray and a light intensity of the second infrared ray are set in advance, and the light intensity of the second infrared ray is not equal to the light intensity of the first infrared ray,
   wherein when the first difference is not less than the first preset difference threshold, the method further comprising:
      controlling the infrared sensor to emit a third infrared ray, wherein a light intensity of the third infrared ray is set in advance and is not equal to either one of the light intensity of the first infrared ray and the light intensity of the second infrared ray;
      acquiring a third effective mean value of light intensities of reflection signals of the third infrared ray; and
      calculating a difference between the first effective mean value and the third effective mean value as a second difference, and if the absolute value of the second difference is less than a second preset difference threshold, outputting that the smart wearable device is in a non-wearing state, if the absolute value of the second difference is greater than a second preset difference threshold, outputting that the smart wearable device is in a wearing state.

2. The method according to claim 1, wherein when the first difference is not less than the first preset difference threshold, the method further comprises: outputting that the smart wearable device is in a wearing state.

3. A method for detecting a wearing state of a smart wearable device that is provided with an infrared sensor, the method comprising:
controlling the infrared sensor to emit a first infrared ray, and acquiring a first effective mean value of light intensities of reflection signals of the first infrared ray;
controlling the infrared sensor to emit a second infrared ray, and acquiring a second effective mean value of light intensities of reflection signals of the second infrared ray; and
calculating a difference between the first effective mean value and the second effective mean value as a first difference, and if the absolute value of the first difference is less than a first preset difference threshold, outputting that the smart wearable device is in a non-wearing state;
wherein a light intensity of the first infrared ray and a light intensity of the second infrared ray are set in advance, and the light intensity of the second infrared ray is not equal to the light intensity of the first infrared ray,
wherein the acquiring of the first effective mean value of light intensities of reflection signals of the first infrared ray comprises:
sampling a predetermined number of the reflection signals of the first infrared ray to acquire a group of sampled signals, and calculating a variance and a mean value of light intensities of the group of sampled signals; and
if the variance is less than a preset variance threshold, taking the mean value as the first effective mean value, if the variance is greater than a preset variance threshold, re-sampling the reflection signals of the first infrared ray to acquire a new group of sampled signals, calculating the variance and the mean value for judgment, and accumulating a number times of sampling; when the number times of sampling accumulated exceeds a preset number of times of sampling, outputting that the smart wearable device is in a non-wearing state, and
wherein for acquiring the second effective mean value of light intensities of reflection signals of the second infrared ray, if the variance is less than a preset variance threshold, taking the mean value as the second effective mean value, and if the variance is greater than a preset variance threshold, outputting that the smart wearable device is in a non-wearing state.

4. The method according to claim 3, wherein the acquiring of the second effective mean value of light intensities of reflection signals of the second infrared ray further comprises
sampling a predetermined number of the reflection signals of the second infrared ray to acquire a group of sampled signals, and calculating a variance and a mean value of the light intensities of the group of sampled signals.

5. The method according to claim 4, wherein the acquiring a third effective mean value of light intensities of reflection signals of the third infrared ray comprises:
sampling a predetermined number of the reflection signals of the third infrared ray to acquire a group of sampled signals, and calculating a variance and a mean value of the light intensities of the group of sampled signals; and if that the variance is less than a preset variance threshold, taking the mean value as the third effective mean value, if the variance is greater than a preset variance threshold, outputting that the smart wearable device is in a non-wearing state.

6. The method according to claim 1, the method further comprises:
recording and analyzing a user's wearing habit of the smart wearable device, and periodically activating the infrared sensor to detect a wearing state of the smart wearable device according to the user's wearing habit; and/or
before the smart wearable device performs a test of a preset item, activating the infrared sensor to detect a wearing state of the smart wearable device.

7. A smart wearable device provided with an infrared sensor, wherein the smart wearable device comprises a memory and a processor, the memory and the processor are communicatively connected through an internal bus, a computer program executable by the processor is stored in the memory, and when the computer program is executed, the processor executes a method for detecting a wearing state, wherein the method comprises:
controlling the infrared sensor to emit a first infrared ray, and acquiring a first effective mean value of light intensities of reflection signals of the first infrared ray;
controlling the infrared sensor to emit a second infrared ray, and acquiring a second effective mean value of light intensities of reflection signals of the second infrared ray; and
calculating a difference between the first effective mean value and the second effective mean value as a first difference, and if the absolute value of the first difference is less than a first preset difference threshold, outputting that the smart wearable device is in a non-wearing state;
wherein a light intensity of the first infrared ray and a light intensity of the second infrared ray are set in advance, and the light intensity of the second infrared ray is not equal to the light intensity of the first infrared ray, and
wherein when the first difference is not less than the first preset difference threshold, the method further comprises:
controlling the infrared sensor to emit a third infrared ray, wherein a light intensity of the third infrared ray is set in advance and is not equal to either one of the light intensity of the first infrared ray and the light intensity of the second infrared ray;
acquiring a third effective mean value of light intensities of reflection signals of the third infrared ray; and
calculating a difference between the first effective mean value and the third effective mean value as a second difference, and if the absolute value of the second difference is less than a second preset difference threshold, outputting that the smart wearable device is in a non-wearing state, if the absolute value of the second difference is greater than a second preset difference threshold, outputting that the smart wearable device is in a wearing state.

8. The smart wearable device according to claim 7, wherein when the first difference is not less than the first preset difference threshold, the method further comprises: outputting that the smart wearable device is in a wearing state.

9. The smart wearable device according to claim 7, wherein the acquiring a first effective mean value of light intensities of reflection signals of the first infrared ray comprises:
- sampling a predetermined number of the reflection signals of the first infrared ray to acquire a group of sampled signals, and calculating a variance and a mean value of light intensities of the group of sampled signals; and
- if the variance is less than a preset variance threshold, taking the mean value as the first effective mean value, if the variance is greater than a preset variance threshold, re-sampling the reflection signals of the first infrared ray to acquire a new group of sampled signals, calculating the variance and the mean value for judgment, and accumulating a number times of sampling; when the number times of sampling accumulated exceeds a preset number of times of sampling, outputting that the smart wearable device is in a non-wearing state.

10. The smart wearable device according to claim 9, wherein the acquiring a second effective mean value of light intensities of reflection signals of the second infrared ray comprises:
- sampling a predetermined number of the reflection signals of the second infrared ray to acquire a group of sampled signals, and calculating a variance and a mean value of the light intensities of the group of sampled signals; and
- if the variance is less than a preset variance threshold, taking the mean value as the second effective mean value, if the variance is greater than a preset variance threshold, outputting that the smart wearable device is in a non-wearing state.

11. The smart wearable device according to claim 10, wherein the acquiring a third effective mean value of light intensities of reflection signals of the third infrared ray comprises:
- sampling a predetermined number of the reflection signals of the third infrared ray to acquire a group of sampled signals, and calculating a variance and a mean value of the light intensities of the group of sampled signals; and
- if the variance is less than a preset variance threshold, taking the mean value as the third effective mean value, if the variance is greater than a preset variance threshold, outputting that the smart wearable device is in a non-wearing state.

12. The smart wearable device according to claim 7, the method further comprises:
- recording and analyzing a user's wearing habit of the smart wearable device, and periodically activating the infrared sensor to detect a wearing state of the smart wearable device according to the user's wearing habit; and/or
- before the smart wearable device performs a test of a preset item, activating the infrared sensor to detect a wearing state of the smart wearable device.

13. The smart wearable device according to claim 7, wherein the acquiring a first effective mean value of light intensities of reflection signals of the first infrared ray comprises:
- sampling a predetermined number of the reflection signals of the first infrared ray to acquire a group of sampled signals, and calculating a variance and a mean value of light intensities of the group of sampled signals; and
- if the variance is less than a preset variance threshold, taking the mean value as the first effective mean value, if the variance is greater than a preset variance threshold, re-sampling the reflection signals of the first infrared ray to acquire a new group of sampled signals, calculating the variance and the mean value for judgment, and accumulating a number times of sampling; when the number times of sampling accumulated exceeds a preset number of times of sampling, outputting that the smart wearable device is in a non-wearing state.

14. The method according to claim 1, wherein the acquiring a first effective mean value of light intensities of reflection signals of the first infrared ray comprises:
- sampling a predetermined number of the reflection signals of the first infrared ray to acquire a group of sampled signals, and calculating a variance and a mean value of light intensities of the group of sampled signals; and
- if the variance is less than a preset variance threshold, taking the mean value as the first effective mean value, if the variance is greater than a preset variance threshold, re-sampling the reflection signals of the first infrared ray to acquire a new group of sampled signals, calculating the variance and the mean value for judgment, and accumulating a number times of sampling; when the number times of sampling accumulated exceeds a preset number of times of sampling, outputting that the smart wearable device is in a non-wearing state.

15. The method according to claim 14, wherein the acquiring a second effective mean value of light intensities of reflection signals of the second infrared ray comprises:
- sampling a predetermined number of the reflection signals of the second infrared ray to acquire a group of sampled signals, and calculating a variance and a mean value of the light intensities of the group of sampled signals; and
- if the variance is less than a preset variance threshold, taking the mean value as the second effective mean value, if the variance is greater than a preset variance threshold, outputting that the smart wearable device is in a non-wearing state.

* * * * *

UNITED STATES PATENT AND TRADEMARK OFFICE
CERTIFICATE OF CORRECTION

PATENT NO. : 11,169,588 B2
APPLICATION NO. : 16/754893
DATED : November 9, 2021
INVENTOR(S) : Haojie Luan Page 1 of 1

It is certified that error appears in the above-identified patent and that said Letters Patent is hereby corrected as shown below:

On the Title Page

Item (71), should read:
-- GOERTEK TECHNOLOGY CO., LTD., Qingdao City, Shandong Province (CN) --

Item (72), should read:
-- Haojie Luan, Qingdao City, Shandong Province (CN) --

Item (73), should read:
-- GOERTEK TECHNOLOGY CO., LTD., Shandong Province (CN) --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*